(12) United States Patent
Evans (10) Patent No.: US 7,496,767 B2
(45) Date of Patent: Feb. 24, 2009

(54) SECURE CONTENT OBJECTS

(75) Inventor: William D. Evans, Cupertino, CA (US)

(73) Assignee: Xerox Corporation, Norwalk, CT (US)

( * ) Notice: Subject to any disclaimer, the term of this patent is extended or adjusted under 35 U.S.C. 154(b) by 1741 days.

(21) Appl. No.: 09/766,142

(22) Filed: Jan. 19, 2001

(65) Prior Publication Data

US 2002/0099947 A1    Jul. 25, 2002

(51) Int. Cl.
*H04L 9/32* (2006.01)
(52) U.S. Cl. ...................................... 713/193
(58) Field of Classification Search .................. 713/193
See application file for complete search history.

(56) References Cited

U.S. PATENT DOCUMENTS

| | | | | |
|---|---|---|---|---|
| 5,634,064 | A | | 5/1997 | Warnock et al. ............. 395/774 |
| 5,737,599 | A | | 4/1998 | Rowe et al. .................. 395/615 |
| 5,740,246 | A | * | 4/1998 | Saito ............................ 705/52 |
| 5,781,785 | A | | 7/1998 | Rowe et al. .................. 395/774 |
| 5,787,175 | A | * | 7/1998 | Carter ......................... 713/165 |
| 5,819,301 | A | | 10/1998 | Rowe et al. .................. 707/513 |
| 5,860,074 | A | | 1/1999 | Rowe et al. .................. 707/526 |
| 5,953,419 | A | | 9/1999 | Lohstroh et al. ............... 380/21 |
| 6,011,847 | A | * | 1/2000 | Follendore, III ............. 713/165 |
| 6,178,422 | B1 | * | 1/2001 | Tada et al. ....................... 707/9 |
| 6,209,103 | B1 | | 3/2001 | Schrieber et al. ............. 713/201 |
| 6,289,450 | B1 | | 9/2001 | Pensak et al. ................ 713/167 |
| 6,298,446 | B1 | | 10/2001 | Schrieber et al. ............. 713/201 |

FOREIGN PATENT DOCUMENTS

WO      WO 00/75754      12/2000

OTHER PUBLICATIONS

"Multimedia Mixed Object Envelopes Supporting a Graduated Fee Scheme Via Encryption", IBM Technical Disclosure Bulletin, IBM Corp., NY, vol. 37, No. 3, Mar. 1, 1994, pp. 413-417.

* cited by examiner

*Primary Examiner*—Brandon S Hoffman
(74) *Attorney, Agent, or Firm*—Jeannette Walder (57) ABSTRACT

A secure content object protects electronic documents from unauthorized use. The secure content object includes an encrypted electronic document, a multi-key encryption table having at least one multi-key component, an encrypted header and a user interface device. The encrypted document is encrypted using a document encryption key associated with a multi-key encryption method. The encrypted header includes an encryption marker formed by a random number followed by a derivable variation of the same random number. The user interface device enables a user to input a user authorization. The user authorization is combined with each of the multi-key components in the multi-key encryption key table and used to try to decrypt the encrypted header. If the encryption marker is successfully decrypted, the electronic document may be decrypted. Multiple electronic documents or a document and annotations may be protected by the secure content object.

20 Claims, 2 Drawing Sheets

SECURE CONTENT OBJECTS

GOVERNMENT INTEREST

This invention was made, in part, with government support under Contract No. 11236-001-00 4V awarded by the Department of Energy. The Government has certain rights in this invention.

FIELD OF THE INVENTION

This invention relates generally to electronic document security and more particularly to systems and methods for securely storing, maintaining and controlling access to electronic documents. Another aspect of the invention relates to controlling access to ancillary information, such as annotations, associated with electronic documents.

BACKGROUND OF THE INVENTION

Electronic documents have become the de facto standard for information creation, transmission and storage. An electronic document (or electronic file or electronic object) typically has content information (such as text, graphics, equations, tables, spreadsheets, pictures, sound, full motion video and other multimedia content, etc.) and formatting information which directs how the content is to be displayed. Different types of content information are more readily understood if formatted in a particular manner. Spreadsheets, for example, are more easily understood if formatted in interactive tables. Many different application programs or languages have been developed for displaying or formatting content information in specific ways. Each language, such as Microsoft Word, Adobe Acrobat, HTML, etc., defines a set of formatting rules which determines how the content information (such as a letter, article, sales information, etc.) will be displayed to a user.

Most users have an interest in protecting content information, especially when the document is not in use. The level of protection desired by users depends on the value of the content information. The more valuable the content information, the more stringent the protections desired by users. To accommodate this, many application programs include methods for protecting content. Microsoft Word, for example, allows users to protect documents by assigning a password. The Word document is stored in the clear, so an enterprising hacker could remove the password and see the document content.

The "Portable Document Format", PDF, created by the Adobe Acrobat presents content information in a format which preserves the publisher's desired presentation appearance and it is platform independent, which makes it attractive for use over the Internet. The Acrobat software provides some document "protection." A PDF document can be encrypted to protect its content. Encryption applies to all strings and streams in the PDF file, but not to other objects which are used to convey information about the document's structure rather than its content. Access to the "protected" PDF document is by a user password. While content is protected via encryption, PDF does not provide for a "secure" transmission, i.e., transmission where the structure and/or other information about the document is not visible. Even with partially encrypted content, however, much can be learned about a document by observing the relationship of formatted content or by comparing one version of a digital document with another. Also, the PDF does not provide for user selected encryption levels, nor for the protection of any preliminary information (which frequently reveals structure of the document) that is presented to the user in order to input the password that any user can read before opening the protected parts.

Many application programs and languages provide for insertion of comments, footnotes, and other types of annotations to an existing document. Annotations are frequently made by persons other than the original document author(s). Whether a non-author can make an annotation to another user's document depends on the particular application program and whether the non-author has been given authorization to make annotations. In a Microsoft Word document, for example, any user having access to a document can insert annotations. In Adobe Acrobat, the user's version of the Acrobat software determines whether the user can make annotations or not. If the user's version permits annotations, then in the normal sequence of events the user will save changes to the annotations causing the Acrobat software to include the new annotation and/or changes to existing annotations in a new version of the existing PDF file.

Such annotations, however, can be read by all users who have the right to open the document (whether it is a Word document or a PDF or some other document type). There is no way to limit who can read or edit the annotations a user added to the file if the new version is distributed to other users with access to a software application that shows/edits annotations. Protection of documents, for example, in which a security mechanism only provides for limiting access to those who know the password for the document cannot be considered a general solution.

SUMMARY OF THE INVENTION

A secure content object, according to the invention, includes an encrypted electronic document, an encrypted header, a multi-key encryption table and a user interface device. The electronic document and the header are encrypted using a document encryption key associated with a multi-key encryption method. For added security different encryption keys may be used for the electronic document and header. The multi-key encryption table includes at least one multi-key encryption component (for each encryption key if different keys are used to encrypt the electronic document and the header). A separate component is stored in the table for each authorized user. The combination of the user information (defined below) and the user's multi-key component will generate the document encryption key. The encrypted header includes information pertaining to the electronic document. The information pertaining to the electronic document may include which portions of the document a particular user has access to as well as what permissions are available to the user. If multiple users have access to a particular document, or one user has access to multiple documents, this information may be stored in the form of a user/permissions table in the encrypted header.

The user interface includes information which identifies the electronic document and an interactive element. The interactive element enables a user to input a user authorization for access to all or portions of the electronic document. The interactive element takes the user authorization and inputs it to a decryption engine which uses a multi-user encryption method to decrypt the encrypted header. The decryption engine combines the user authorization with each multi-key component stored in the multi-key encryption table and tries to decrypt the encrypted header. If the encrypted header is validly decrypted, the correct key has been found. Then the interactive element enables the decryption engine to decrypt the authorized portions of the encrypted electronic document.

Although the encryption method is called a multi-key encryption method, one or more multi-key encryption components may be stored in the multi-key encryption key table. To improve security and make it more difficult to determine a user's authorization information, additional dummy components may be stored in the table. Also, the multi-key components in the table may be randomly shuffled each time a request is made for access to an electronic document. Although the multi-key encryption table is usually stored with the secure content object, the table may be stored locally on a user's computer or workstation or on a remote server.

The user input authorization may be any user input information, such as for example, a user ID or name, password or pass phrase. Additionally, user input from any biometrics type input device may be used alone or in combination with the user ID/password. A biometrics input includes, for example, a fingerprint, voice recognition phrase, eye or iris detector, retinal scan, etc.

The document encryption key may be generated using a variety of information. In the multi-key encryption system, the document encryption key is based on each user's information and a corresponding multi-key component needed to regenerate the document encryption key. Alternatively, the encryption key may be based on a combination of user information, the multi-key encryption component and an ID assigned to the particular electronic document. In this way a unique key may be created for each user/document combination. Assigning a document ID to each electronic document facilitates greater security.

In one embodiment of the secure content object, the encrypted header includes an encryption marker formed of a random number sequence followed by a derivable variation of the same random number sequence. When the encryption marker is validly decrypted, the correct key has been found. The encryption marker uses a random number sequence, which avoids the pitfalls of a fixed text encryption marker. An encryption marker may also be added to the beginning of the encrypted electronic document. Valid decryption of the encryption marker at the front of the encrypted electronic document means the electronic document will also be validly decrypted. It is often difficult to determine from inspection of the decrypted document whether the decryption is correct, especially when the electronic document is of an unknown format.

The multi-key encryption table includes no information which may identify the users or the document. Also, the encrypted header contains no information identifying the user or other identifying information or information which identifies the type of document. This helps defeat hackers who would try to break the encryption. Also, if the hacker knows the type of file (most files begin with the same characters at the beginning of the file), it is easier to break the encryption.

The electronic document may be any type of document, especially those documents which include content information and formatting information for directing how the content is to be displayed. The formatting information is based on an object language, such as used by or interpreted by or contained with Microsoft Word, Excel, PowerPoint, Adobe Acrobat, etc., having a set of formatting rules. Different user authorizations can be associated with different portions of the electronic document enabling different users to have access to different portions of the same electronic document. Multiple electronic documents, each with a different level of encryption and different level of access, may be associated with the user interface device. The encrypted header may include information pertaining to the electronic document including a user permission table which sets forth which users have access to the document and what types of access.

When the secure content object is stored or transmitted, the electronic document is protected since it is encrypted. The entire electronic document may be encrypted (including content and formatting information) or only those portions desired to be protected may be encrypted. When a user desires to view the electronic document or portion to which he/she has access, the user interface device prevents decryption and display of the electronic document (or portion) until the required user authorization has been input.

The user interface device may be implemented using the document language as another electronic document. Alternatively, the user interface may be implemented using a non-host specific format. When the user interface device is implemented as another electronic document, it can be thought of as a "cover sheet". The cover sheet includes clear information which identified the electronic document as well as provides for access functions.

The secure content object of the invention enables users to create annotations pertaining to an existing electronic document (which may be encrypted or unencrypted) and to limit access to those annotations and while providing encrypted security for the annotations. The secure content object may be used in those instances when multiple authors may wish to make annotations or comments to a common electronic document and control access (and knowledge of) their annotations among other users. For example, the original electronic document may have no restrictions on viewing (all users may view it), so it is not encrypted. One or more users/authors (including the original author) may wish to make annotations or comments to the electronic document. Each annotation author may wish to limit access to one or more of the annotations. Each such annotation may be encrypted and access limited to certain users.

The existing electronic document may or may not contain annotations from other users at the time the user adds/edits his/her annotations and updates the electronic document. For example, in a group of three users who share an electronic document such as a PDF file, User One can annotate the existing electronic document and grant to User Two the right to view the annotations but withhold that right from User Three. Thus User Three will be able to view the existing electronic document but will not be able to access the contents of User One's annotations in the shared file without breaking the encryption to User One's annotations.

The invention provides a method by which annotations may be added to an existing electronic document conforming to a particular document language or multiple electronic documents may be associated with a single interface device. The annotations (while optionally leaving the existing electronic document in the clear) and electronic documents may be encrypted to keep them private. The multi-key encryption method may also be used to encrypt the annotations. A user's encryption key is used to indicate (the fact that the user's information decrypted the annotation) the user has access to particular annotations or to an electronic document or portion thereof. The ability to use the user's authorization information in a multi-key system governs his/her ability to view the particular annotations or electronic document or portion thereof.

DETAILED DESCRIPTION OF THE PREFERRED EMBODIMENTS

Figure 1:
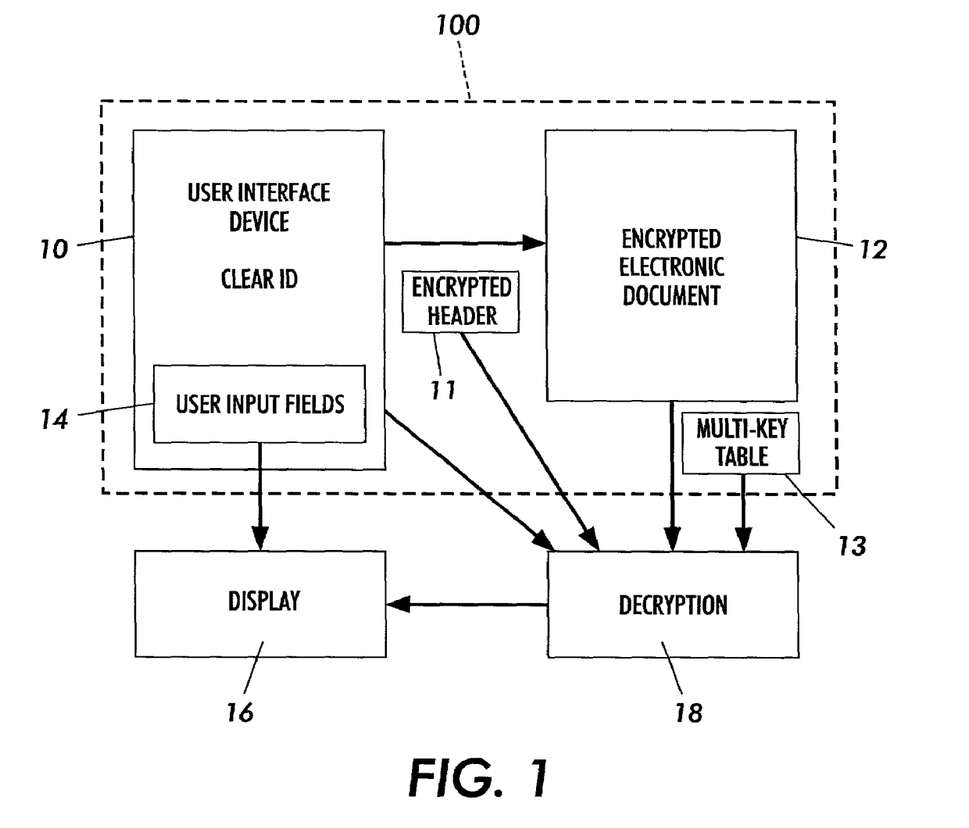
FIG. 1 is a block diagram of a secure content object according to the invention.

A secure content object 100 is shown in FIG. 1. Secure content object 100 includes encrypted electronic document 12, encrypted header 11, multi-key encryption table 13 and user interface device 10. User interface device 10 includes a clear ID for identifying the encrypted electronic document 12 and an interactive element, which in this embodiment is shown as user input fields 14. The secure content object 100 may be stored in memory either locally or on a network. A user may access the secure content object 100 through a local computer or networked workstation having a display 16. Since the electronic document 12 is stored in an encrypted state, its content is protected against untrusted users. Storing (and transmitting) encrypted electronic documents ensures their content will be protected against inadvertent loss or theft (at least to the level of the encryption). Trusted or authorized users can view the electronic document content information in the clear by satisfying some security requirement, e.g., user authorization, such as for example, a user ID or name, password or pass phrase or, user input from any biometrics type input device. Depending on the level of security desired, one or more of any well known encryption scheme may be used.

Electronic document 12 is encrypted using a document encryption key. The multi-key encryption table 13 includes at least one multi-key encryption component. A separate component is stored in the table for each authorized user. The combination of the user information (if authorized) and the user's multi-key component will generate the document encryption key.

The secure content object would typically be implemented in software, for example, as a plug-in to the existing application used to create the particular type of electronic document. When the user opens the application program and requests access to a particular electronic document, the application program with plug-in (executed by the computer processor) would display an interactive screen on the display 16 for the user to input the required authorization information. The user interface device inputs the user authorization information to decryption engine which combines the user authorization information with each of the multi-key components in table 13 in order to decrypt the encrypted header 11. If the encrypted header is validly decrypted, the user interface device sends the encrypted electronic document 12 to a decryption module (also executed by the processor) where it is decrypted. Upon completion of the decryption, the electronic document, or portion thereof depending on the particular user's authorization, would then be displayed on display 16 to the user.

The decryption engine 18 uses a multi-user encryption method. A multi-user encryption method relies on a plurality of multi-key components stored in the multi-key encryption table 13 (which may be stored locally or remotely). For added security, if the number of authorized users is below some predefined threshold, dummy keys may be added to prevent the less skilled from determining the user authorizations and gaining access. The multi-key system must combine the user authorization with each multi-key component to decrypt the encrypted header to determine if the input user authorization (e.g., the user ID/password/pass phrase or biometrics information) is correct. The decryption engine 18 combines the input user authorization with each of the stored components until the correct key is found to try to decrypt the encrypted header 11. The encrypted header may include a special encryption marker which includes a random number sequence followed by a derivable variation of the same random number sequence. Thus, when an encryption marker in the encrypted header has been determined to be valid, the correct key has been found. Then the interactive element enables the decryption engine to decrypt the encrypted electronic document.

The user may or may not have access to view the entire electronic document in the clear. Different users may have access only to portions of an electronic document (such as subsections, executive summary, annotations, etc.), in which case, upon receipt of their authorization information only those portions would be decrypted and displayed.

The secure content object may be used in one or more of the following scenarios. (1) A user with a Multi-Key secure content object emails it to a group of people, each of whom can use their own user identifications to open it. Permission for "copy to clipboard," printing, lifetime of the document, etc. varies among members of the group who receive the document. (2) A user has some very private data which exists in a binary formatted file (movie, sound, market research, test results, etc.) for an external application, along with a document that details information about these data that also is very sensitive. To keep these files linked and secure the user creates a secure content object that contains the data and the document. The user can selectively withhold the binary extraction for some users as required. (3) A Human Resources Department has some documents that should only be used within the department, but in the past some of these have been exposed to outsiders by valid users in the department opening them outside the department. To prevent this they set all their documents to only open on their network. (If the nature of their network protection is correct, this also prevents the documents from being printed outside the department). (4) A company has private documents, very loosely protected by a well known user identification. These documents should not be distributed but one is found on an unprotected public server. They use the "fingerprint" (described below) included in the secure content object to trace the document back to the user who was the source of the misplaced secure content object. (5) A user is in the process of creating a sensitive document and wishes to protect the source file in case he looses his laptop computer. At the end of each editing session the user wraps it in a secure content object and deletes the unprotected source file. A variation is the user also uses the local application to include a PDF of the document in the secure content object and uses this to review the work and annotate it for future changes until there is more time and/or the user is working in a more secure environment.

It should be noted no method, including the secure content object, can secure a document or binary file from a malicious user who has a valid identification that can decrypt the contents. The secure content object can prevent and enforce restrictions on what the user can do with the contents but, since the user controls the computer, with some effort the user always will be able to transfer the contents to some non secure form (e.g., the user may photograph the screen when the document is open).

The security of the secure content object to an attacker who does not have valid identification is only as strong as the encryption method used. The security of the method chosen and its implementation is determined by the particular implementation.

While a secure content object may be created on a user's personal computer, in most cases it is assumed the creation occurs on a network server that is not the user's personal computer or workstation. Generally, such a server will be secure and it has access to a central security server that can provide user identifications for a group of users. There are many ways, known in the art, these user identifications can be distributed. Note that if a user has a secure content object, is a valid user of the secure content object, and wishes to make another secure content object for the same set of users, it is possible when using some forms of Multi-Key encryption. The method described below do not expose the other users' identifications in any way so is normally limited to users who are protecting local documents where they are the single user.

The invention is not limited to any particular application program for generating and manipulating electronic documents. However, the invention will now be described, for convenience, in particular detail using the Adobe Acrobat software created PDF documents.

EXAMPLE

PDF Documents

The Portable Document Format (PDF) is a file format specification language for the representation of documents using the Acrobat software by Adobe Systems, Inc. The Acrobat specification, published by Adobe Systems, Inc., is "Portable Document Format Reference Manual, Version 1.3" (PDFRM) of which the most current version can be found at http://www.adobe.com. Section references are to the March, 1999 version of the PDFRM.

The following defined terms from the PDFRM are used in the example embodiment as indicated by a reference to the defining section of the PDFRM.

Object—The fundamental element in a PDF. Objects may be "direct" or "indirect" and in some cases may be restricted to one of these by use (Section 4 of the PDFRM).

Dictionary Object—A fundamental PDF Object which consists of Key and Value pairs (Section 4.7 of the PDFRM). The Dictionary Object may also be referred to simply as "Dictionary". Many Dictionaries have a "Type" that defines their use and, frequently, they may be called by their type without indicating that they are Dictionaries (e.g., File Specification). As used in this example, such naming by type, means the Dictionary as described in the PDFRM.

Array Object—Used in this example only with reference to the Annotations array of a Page Object as defined as part of the Page objects of Section 6.4 of the PDFRM.

Stream Object—One of the base classes of Objects that contains a Dictionary and a sequence of data bytes. In this case the Dictionary and the necessary standard parameters defined in the PDFRM are used. To "store as a Stream Object" means the Dictionary is made to conform with the PDFRM and the data in question is placed in the byte sequence of the Object in the manner defined by the PDFRM (Section 4.8 of the PDFRM).

Annotation—An addition to a PDF document made by a user and defined in Section 6.6 of the PDFRM. Generally restricted to one defined explicitly in Sections 6.6 through 6.6.15 of the PDFRM, but not limited to those so defined. Note the Pop-Up Annotation is defined in these sections but normally does not appear directly as an Annotation created by a user. In normal use, a Pop-Up Annotation is a "child" of one of the other types of Annotations defined in these sections. Existing only as a child means that, for this example, it is included as part of its parent, whether or not that is explicitly stated. (Generally the Annotations of the PDFRM as used in this example include but are not limited to Text, Stamp, Circle, Square, StrikeOut, Highlight, Underline, Ink and Pop-Up.) Also, an Annotation may be dependent upon other Objects that are included in the current version of the PDF. As used here, Annotation automatically includes these dependent Objects whether direct or indirect. That is, a single Annotation could have many parts if it were to be moved or copied to another document, but for the purpose of the invention, these parts may be treated as a single Annotation.

Action—Something that happens when triggered by an event which may be one defined in Section 6.8 of the PDFRM. In normal use additional Actions may be defined by software applications or Plug-In software to such applications. As used here Action normally means, but is not limited to, an Action defined by software to activate an activity as described as part of this embodiment of the invention and is activated by one of the events associated with the Widget annotations of Section 6.14.4 of the PDFRM. In particular, the Action may be included in the Push button Widget (Section 6.14.7) to invoke all or parts of this embodiment.

PreViewing Load—Applications that render a PDF document will normally read the PDF file and do what is required to organize the PDF objects into a form required for the rendering of the contents as pages, text, graphics, etc. This operation occurs before the user sees a rendering of any page of the document. In the case of the secure content object the result of this stage of preparing a PDF for the user is when it is preferred that the PDF be altered by the addition of Annotations as defined by the invention. While this is not necessary, the changes dictated by the invention may cause artifacts in the rendering process that the user may find offensive. That is, it is preferred changes to the PDF occur before the user can see them. This will be true if they occur in the PreViewing Load.

Widget—Buttons, text fields, and other forms of Annotations as given in Section 6.14 of the PDFRM. Of particular interest here is the Text Field of Section 6.14.11 and the Button Field of Section 6.14.6. The Text Field provides a method by which text may to be entered by the user and, by the use of "named" fields, that text can be read by software while the document is being viewed. The Button field provides an event that can activate an Action that is private to the software implementation of this invention. As used in this example, the Text Field entries provide a method by which the user may present his/her identification (name, password, pass phrase) to the software. (The name "Widget" comes from the Annotation subtype for these items which must be set to "Widget.")

Additional terms as used in the PDF example embodiment have the following definitions.

Plug-In—Software that will work with a particular software application that renders PDF documents and user Annotations. Plug-Ins provide abilities beyond that provided by the basic application and may refer to the functionality of a secure content object or the provision for encryption. For example, the secure content object (including user interface device) functionality of this invention can be provided by a Plug-In to an Adobe System, Inc. product with the explicit encryption methods being provided by another Plug-In to the same product.

Multi-Key Encryption—Any of several common methods by which data may be encrypted using what is a basically a random key, but can be decrypted by two or more users given a user's identification. (Commonly, name, password and/or pass phrase or biometrics information and/or combinations thereof are used for this identification.) Normally, if done correctly, this does not compromise the security of the encrypted data. In one type of multi-key encryption, unencrypted information (the multi-key component stored in the multi-key encryption table) is associated with the encrypted data which, when combined by the method with the user input authorization, allows a decryption key to be generated for use in decrypting the encrypted file. It is assumed the format of this clear text is implementation dependent but it can be identified in data that uses the Multi-Key technique. A significant attribute of the technique is that there is no way to know from the input user authorization the correct operation that will create a decryption key. That is, the decrypted data (usually the encrypted header) must be decrypted and examined to determine if the correct key was used. In the worst case this decryption and examination may occur as many times as there are possible user keys and only after all have been tried can it be determined that the current user's identification is invalid.

Encryption Marker—A short sequence of data, as implemented by the methods of the invention described below, placed in front of the data to be encrypted to improve the security of the encrypted data (assuming cipher-block-chaining is used) and to provide a way of knowing when the correct key for decryption has been used. The optimal length of the sequence may vary with the encryption method as long as the Marker is uniquely identified when attempting to decrypt the data. For example, one might start all encrypted data with 13 random bytes followed by a derivable variation (such as a permutation) of the first 13 bytes. An optional clear text phrase may be inserted between the two random number sequences, however, this may leave the encryption marker less secure. When testing keys by a Multi-Key encryption method on this data the occurrence of this Marker would indicate that the correct key has been found, independent of the content of the rest of the data that was encrypted. The random bytes are generated by current art and ensure there is no "fixed front" to the data to be encrypted while still giving a clear indication of having the correct key without the decryption software interpreting the data being protected.

Server Mode—In the methods of the invention the source of the PDF is from a Server that serves as a distribution point for all users. In this mode Annotations to a PDF that are to be available to all users of a PDF document are sent to a server that merges them with other user's annotations and makes available a new PDF for all users. Use of this mode does not necessarily mean which computer it occurs but rather means the merging activity that must occur for the general distribution of Annotations.

Local Mode—In this mode Annotations are physically local to the current user and not available to other users. It is normally assumed these changes will remain on a single computer but, given all files are moved, this is not a restriction. This mode keeps the Annotations secure, and private, until such time as they are merged using the Server Mode. Note any difference in Local and Server Mode has more to do with the actions taken than where the action occurs—that is, Server Mode actions could occur on the same machine as the current user.

Hash—Sometimes called a "Message Digest". The results or algorithm which calculates, a short binary sequence from some sequence of input data. When referring to a user's identification here it is not normally the clear text of the user's name, password or pass phase that is being referred to but rather the output of a hash function on some combination of these plain text items, and the secure content object (SCO) identification, that is being referred to. Since the hash function is "one way" this effectively hides the text from anyone who might want to learn its content and makes such representations unique to a particular SCO. Many different hash algorithms may be used. The current implementation uses the Secure Hash Algorithm, SHA-1, as defined in the Federal Information Processing Standards Publication (FIPS PUB) 180-1 but this is implementation dependent. (Another that is widely used is MD-5.)

The secure content object of the invention provide security for a PDF document by controlling who can view, print, copy out text, or modify by annotations a PDF document. In addition to these restrictions related to opening a document for viewing, the methods also provide for timed restricted viewing, host restriction by connected networks and may be extended to any other restriction which can be imposed based on information available to the implementation at the time the user attempts to open a document. It is not necessary that the secured content be "viewable" as the methods provide for securing arbitrary binary data files for extended periods.

The secure content object may be implemented either as a Plug-In or as part of a PDF viewer or viewer/editor. A user who has obtained a PDF that is contained within a secure content object would use the Plug-In viewer to open the PDF. In one embodiment of the secure content object as implemented with the Acrobat software, the user interface device may be implemented as a "Cover Sheet." A Cover Sheet is another PDF document with special attributes defined below. So, when the user uses a SCO Plug-In viewer to open an encrypted electronic document, the user is presented with a single page "Cover Sheet" document (which may look like another PDF document consisting of one page) that consists of two regions. One region of the displayed page contains the information to which the creator of the PDF allows unrestricted access. For example, the nature or name of the secure document, any restrictions, security level notices, warnings on use, dates, times and other unrestricted general information that may be useful to someone who happens to obtain a copy of the file and opens it.

The other region of the cover sheet contains Widget annotations consisting of two to three Text Fields (and optionally controls for activating a device for inputting user biometrics data) and one or two Button Fields. (The number of Text and Button Fields depends on the amount of information that required. Any number may be used.) The Text Fields are the designated entry locations for the user to enter name (plain text field), a password (set to echo the "*" character on entry) and a pass phase (echoes "*" as in password), for example. It is up to the creator of the PDF to specify if both password and a pass phrase or just one of them is used as part of the user identification. The Button Fields are linked to the Action(s) dictionary that designate private actions supported by the implementation of this invention. The implementation of these private actions is responsible for either opening the PDF or extracting a binary secure file from the PDF, depending on the Button Field to which it is linked and whether or not the user entered the correct information.

In the PDF implementation, the encrypted PDF document may be the encrypted content (with little or no formatting encrypted) as described above or a completely encrypted PDF. Both of these encryption scenarios work within the limitations of the PDF format. However, a user may encrypt a PDF document in a non-format preserving manner using any known encryption technique. An advantage of using the Acrobat defined encryption is that binary files (portions of the PDF document) may be easily extracted.

When either Button's action is triggered by a mouse event, the interactive element will read the user identification from the Text Fields and use it to try to open an encrypted section of the Button's target Object Stream. The ability to decrypt this section indicates that the user's identification is valid and, given no permission restrictions for this user/host, the file action can be completed. For a fully encrypted PDF this action causes the cover sheet to be replaced by the decrypted PDF as explained in the following sections or, for the binary content, the user to be queried about where to place an unencrypted version of the binary file followed by the extraction of the file to the indicated location.

This embodiment uses PDF to obtain the user authorization information, and not a host dependent method. Using the facilities of PDF to obtain this information gives the implementation a degree of independence from the host operating system that is not normally available. Note the cover sheet could be a host dependent method, if desired.

It is implementation and viewer dependent as to whether or not the decrypted PDF replaces the cover sheet or opens in a different window. This is also true for the methods used by which the implementation interacts with the user to obtain the target location where the extracted binary file will be placed.

The secure content object hides everything about the electronic document (e.g., the PDF) since the contents and formatting information are fully encrypted by an encryption method chosen by the particular user or implementation or by the fact the encrypted header is decrypted first before the encrypted document. The secure content object provides an open cover sheet that can show users general access information about the contents of the PDF before the PDF document opens—a feature that can save the user considerable time when searching for a previously used document in a large collection.

Figure 2:
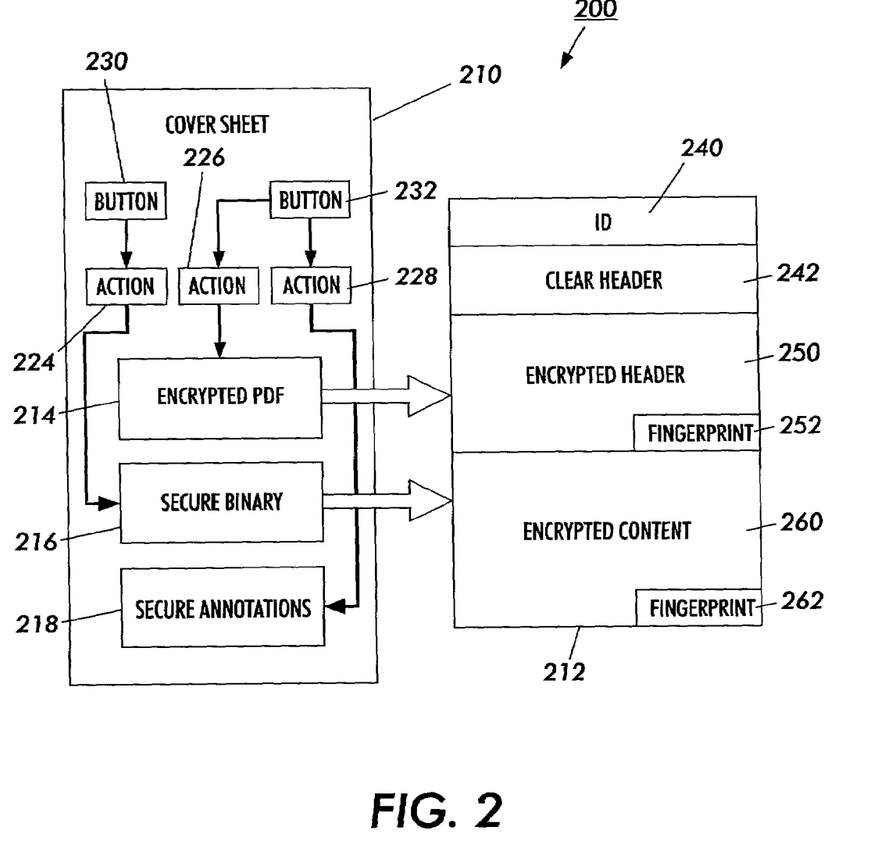
FIG. 2 is a block diagram of a secure content object implemented using PDF.

A secure content object 200 implemented in PDF is symbolically shown in FIG. 2. SCO 200 includes cover sheet 210 which can access up to three encrypted electronic documents 212 (only one encrypted document 212 is shown for convenience). Each encrypted document 212 includes an ID 240, a clear header 242 which identifies the document to users and contains the multi-key encryption table holding the multi-key components used by the particular Multi-Key encryption method, an encrypted header 250 with fingerprint 252 and encrypted content 260 with a second fingerprint 262.

In this embodiment, cover sheet 210 is implemented as a PDF document conforming to the PDFRM. Cover sheet 210 includes up to three Stream Objects 214, 216, 218 containing the secure information and the action links 224, 226, 228 between these sections. There are two Button Fields 230, 232 which connect the cover sheet 210 to the Stream Objects 214, 216, 218 that contain the encrypted files and other information. These Button Fields 230, 232 can use all the options as described in the PDFRM (in Table 6.10) as required to give them the desired appearance. Although many of these options need not be set, it is required that the Dictionary key "AA" (Additional Action in table 6.10 of the PDFRM) be set in their defining Dictionary to point to the indirect Object that defines the Action that links to the implementation registered action by the "S" key of its Dictionary (as defined in Table 6.36 of the PDFRM).

In this example, there may be up to three Stream Objects 214, 216, 218 in the cover sheet 210 that reference or link to a secure object (such as a Encrypted PDF, a Secure Binary file or a Secure Annotation file, described below). Each of these objects is a Stream Object whose Dictionary key "Type" is set to "EmbeddedFile" (PDFRM Section 7.4.3). Not shown are the File Specification Dictionaries (PDFRM Section 7.4.2) for each of the files which are used as indirect Objects in the Annotation Dictionaries of the Button Fields 230, 232 on the cover sheet 210. The File Specification reference is used by the implementation software to locate the Stream Objects at the time the Action is triggered by an event. (The use of the File specification, if used to make the PDF conforming, adds no real value as the files could be directly linked to the Annotation dictionaries since, for security reasons, the File Specification can contain no useful information about the source or contents of the Stream Object files to which they point.)

After opening, the cover sheet 210 provides the user interface for accessing the secure content in encrypted document 212. When the user selects button 230, 232 an appropriately linked action 224, 226, 228 begins processing of the Stream Object 214, 216, 218. For example when button 232 is selected, action 226 is implemented causing processing of Encrypted PDF 214 to begin. Similarly, when action 228 is selected, processing of Secure Annotations 218 begins. When button 230 selects action 224, processing of Secure Binary 216 begins. Processing of the selected Stream Object typically means providing some means for the user to input the implementation specific user authorization, followed by implementation of the multi-key encryption method to determine if the user authorization is valid, and if valid, the selected item is then decrypted (as further described below).

Although not shown in the diagram, the user identification Text Fields (and/or biometrics input controls) are part of the cover sheet 210 and their annotation dictionaries must have the "T" key string value set to a unique name that is known to the software implementation. This is necessary so that the implementation can obtain the user entry for each field when one of the buttons 230, 232 is activated.

In practice the content of the SCO may vary; it may contain the three objects as shown in FIG. 2 or only one of the buttons may be included. In that case the Stream Object(s) that links to the missing Button Field would also not occur.

The Secure Binary Stream Object and the Encrypted PDF Stream Object (both encrypted electronic documents) share a common internal structure 212. The "ID" 240 begins the data of the stream and consists of a text tag that is used to mark the type of the following data. Its presence in all implementations is not required but it does provide the processing software with a quick method of being sure that it is reading a Stream Object of the type expected. A typical length of this section would be four characters.

Following the ID 240 is the "Clear Header" 242 which must contain at least its length so that the software can find the beginning of the next section, a data sequence that is unique to this SCO (mixed with the clear user identification using the hash function) and any Multi-Key encryption information that is required to give more than one user access (the multi-key encryption table which contains the multi-key components). Generally this would include the number of users followed by the user key generation information of the Multi-Key method (the multi-key components). Any other information that is included in this section is implementation dependent but typical of its content would be a document number and any other information the user may wish to provide that will not compromise security.

Following the ID is the "Encrypted Header" 250 which is encrypted using the implementation selected algorithm. The decryption key to this section depends on the Multi-Key method used (a randomly generated key) or is a function of the single user's identification. Since the Multi-Key method and cipher block chaining is normally used it begins with an Encryption Marker for decryption validity. This allows for reading the data only as a sequential stream (cannot back up in the data) and decrypting the blocks containing the marker till the correct key is found. Following this are the real contents of the header which includes the length of the Encrypted Header, the length of any Fingerprint 252 that follows the header (the sum of which tells the implementation where the real file data begins), a permissions matrix and any other limited access information about the secure file that may be needed by the implementation (e.g., for a binary file the name of the file could be here). This information is then followed by random pad data when block encryption is used to make the header an even number of blocks. (It is advantageous to also add some small random number of blocks so that the actual length of the Encrypted Header is not of uniform length for even an SCO that contains the same secured data.) Note the length of the Encrypted Header is not in the clear and one must be able to decrypt the beginning to locate the encrypted file section that follows it in the Secure Stream Object.

The permissions matrix used in the Encrypted Header matches users to their permissions. The actual format of this item is implementation dependent. However the included implementation has several key aspects that should be considered for other implementations. The method used to match a permission set does not provide any information about who that user might be. That is, if one does obtain the decrypted permissions matrix, one will not obtain any information about any user identification (users are indicated by a hash). Permissions that are included grant the right for a user to "copy to clipboard", print the document, and add annotations to the document once it is open. In addition the permissions can restrict the opening of the document by an implementation if it is after a specified date, if the computer does not claim to have a network address that is designated by a network mask combined with a network address, if the computer does not furnish a particular hardware dependent "host id" or if the computer system indicates it does not have a network address (cannot open SCO when network connected).

The Encrypted Header 250 may be followed by an optional small Fingerprint 252. This is not necessary but, if source identification of the SCO is required, this is one of the places that such information can be positioned. Since the Fingerprint 252 is not secure, it may be advantageous to encrypt it using a known key and Encryption Marker, followed by the required data padded with random bytes to be an even number of encryption blocks, followed by a small random number of blocks filled with random data. Since all of the Fingerprint is encrypted, the Encrypted Header's 250 length is not known, and varies, the Fingerprint can only be located by someone who is not a valid user by decrypting forward from the front of the Encrypted Header until the Fingerprint's Encryption Marker is found. This would only occur if tracing a SCO since the normal processing of data knows the length from decrypting the Encrypted Header, and just skips over it in the stream.

The next section is the Encrypted content 260 which is the actual secure data file. However, as in any encrypted section, it begins with an Encryption Marker. This allows the implementation to verify that it has a valid key for any file format. It is also preferred that this marker be followed by the actual length of the data since normally this will not be the same as the length as the remainder of the Stream Object when block encryption is used and/or the section is followed by another Fingerprint 262.

Following main data 260 is another optional Fingerprint 262 containing data that can be used to trace back to the owner of the SCO, or provide some other implementation specific feature such as date, revision number, etc. This could be of the same form as the previous Fingerprint but, if that were the case, would use a different encryption method or key. Random padding of this section with random data may also occur.

Note the Fingerprints as defined here are not secure from a dedicated attacker but, like the random padding of sections which causes SCOs with the same content to vary in length, are intended to discourage the less skilled. (This is not true for the random data that is used in the Encryption Markers which are used to remove "fixed text" from beginning an encryption sequence.)

"Random data" as used several places in the SCO refers to data that is generated by standard software for pseudo random sequences. Normally the software takes a "seed" that is varied for each SCO so that each SCO created is unique within the limits of the pseudo random sequence. These data are used for the beginning "text" of any encryption sequence and any padding that may be required for cipher block aligning of items or sections.

Each Stream Object 212 includes an unencrypted section followed by a contiguous stream of encrypted data mixed with random data. The clear section contains no identifiable user information. The SCO data 240, 242 that is in the clear is only used as an input to a key determining function which requires a hashed user identification to produce a valid output. Correct decryption depends on testing keys from the Multi-Key method until a valid Encryption Marker is found with the data in this marker varying from SCO to SCO in a pseudo random way. The encrypted sections cannot be reliably separated until one can decrypt the Encrypted Header 250. (This is only a deterrent for less skilled attackers.) The encryption method depends on the implementation and could vary from SCO to SCO. Provision is made for rudimentary fingerprinting 252, 262 of the SCO to include the ability to trace to whom the SCO was initially given (who requested that it be created). User permissions are keyed to each users identification. Different master keys and different Multi-Key functions may be used for the Encrypted Header 250 and the Encrypted content 260.

The SCO is used when a user opens the encrypted PDF or extracts the secure binary file. First, the user opens the SCO in a viewer/editor which will show the cover sheet 210. The user then enters his/her identification information (not shown) and clicks on one of the Button Fields 230, 232. In general the processing for both Button fields is common up to the point where the secure file can be decrypted so the following does not distinguish between them till that point is reached.

The Button Fields 230, 232 have a private (not defined in the PDFRM) Action implemented in a Plug-In or as a part of the viewer/editor (private Actions are allowed in PDF viewers in common use). The software in support of this Action 224, 226, 228 will begin its processing when the user's mouse event occurs on the Button Field 230, 232. At that time it is either given a dictionary for the action or a dictionary that allows it to locate one of the possible dictionaries used to contain the indirect object reference to Stream Object 214, 216, 218 that is linked to the button 230, 232.

Having obtained the Stream Object the data it contains is processed sequentially from the beginning. First the ID is read and verified and then the Multi-Key information and SCO identification is read and saved. The user identification information is then read from the Text Fields and processed, along with the SCO identification, into one way hash values which prevents revealing their true values. Best practice then has the password and pass phrase text fields cleared by the implementation at this time so that their "clear text" values are no longer available in the computer. These hash values are then used by the Multi-Key function as the user's input.

The Stream Object is then read until it is known that at least the Encryption Marker can be decoded given a valid key. Decryption of the marker is then attempted for each of the possible users by inputting their Multi-Key data for the Encrypted Header into the key generation function. If a valid decrypted value for the Marker is not found for any of the keys, it is assumed the user identification is not correct and processing of the SCO ends.

Once the key for the Encrypted header 250 is found its length becomes known and the remainder can be decrypted and the current user's permissions obtained. Those permissions that are not related to opening a PDF are checked at this time. If all of the conditions in the permissions are not met then the processing ends (e.g., the current date is past that granted by the permissions). If processing continues, reading of the Steam Object then skips forward to the beginning of the encrypted content 260, reading and decrypting the Encryption Marker to verify that everything is valid. This decryption may or may not be required to try all keys depending on the implementation and if the "index" of the user whose Multi-Key information decrypted the Encrypted Header can be used.

After the Encryption Marker is verified at the front of the content, the processing branches depending on which Button Field 230, 232 was activated. In the case of file extraction, the software presents the user with the standard file save user interface for the operating system and, unless the user selects the option to cancel, decrypts the data from the Stream Object into the new file. At this point further security becomes the responsibility of the user as it is now independent of the SCO.

If the activated Button Field 232 is linked to the encrypted PDF 214, it is read into memory from the Stream Object without being decrypted. (This is required, as the Stream Object in the cover sheet may be closed but the data within the encrypted PDF is still required to be available.) Then a memory file object is created for the viewer/reader and given to it for a low level open (open without viewing). At this time, or when the viewer/reader will first accept restrictions on the use of the document, the permissions for the document are set using the permissions from the encrypted header. As the viewer/editor processes the PDF it uses the memory file which decrypts the data in the PDF as required. Note it is not necessary that the encrypted PDF data be retained in memory as it could be saved as a local file while remaining encrypted. Using the local disk system should not expose the contents but the preferred implementation uses memory to avoid any problems that might occur if the disk file was not removed when the PDF closed in the viewer.

Once the encrypted PDF has been opened without errors as a low level document, the viewer/editor is requested to replace the open cover sheet PDF with the newly opened PDF and the user may view it. This completes the action that started with the mouse event on the Button Field.

Note in this process the PDF contents 260 or Binary file contents 260 are not decrypted until the permissions are verified as valid. The encrypted PDF is never decrypted in full as the decryption occurs only when the reader/viewer requests a block of data from the PDF during its processing. The implementation does not keep clear versions of the user identification but rather uses a hash function that mixes the user information with the SCO identifier for all of its processing. All encrypted contents may also include an encryption marker. This is especially valuable when the format or type of the encrypted content is not known. For example, if the encrypted content is binary test data, there is no way for a user to inspect the "decrypted" data to determine if it is valid. Hence, knowing that the encryption marker preceding the content decrypted validly ensures a valid decryption of the content.

In a farther implementation of the invention, the secure content object can be used to protect annotations 218, even if the main document is not desired to be protected. As noted above, the annotation feature can be used in any application program that provides for the creation of annotations. In general each application program will have its own sets of rules for creating annotations. The annotation implementation will be described with reference to PDF documents and includes storage or transmission of new annotations by a user; the merging of different user's annotations into a object within the PDF; the opening of a document that has local and/or distributed annotations.

Given the user has edited the original PDF by adding annotations there are two possibilities: one, the user wishes to stay in Local Mode (user private annotations) or, two, the user is part of a network and is in Server Mode (distributed annotations). Software implementing both of these modes of the invention may exist in the viewer/editor application either directly or as a Plug-In to the application.

The sequence of actions to create a secure content document with encrypted annotations differs from the normal creation of a new PDF version as follows. First, the annotations belonging to the current user are extracted, or a list made for extraction during the encryption step, from the edited PDF. This process includes not only the principal annotations but the Pop-Up annotations that are children of other annotations. Since an annotation is located on a page, it is assumed during the listing or extraction process that all such annotation object's dictionaries are marked with the page number on which they reside. During the extraction current user annotations are differentiated from other users annotations by a key/value pair that was placed in the annotation dictionary when the other user's annotations were added for viewing.

Given there exists, or can be obtained, a user key to an encryption method, the annotation objects and any objects on which they depend are then encrypted using the current user's key and formatted into a data sequence. The exact form that the extracted annotations take is not critical; it is only required that the implementation of the invention be able to add the extracted annotations back into a PDF at a later time. Then two actions are available. In Local Mode the data is written to local disk as a file that consists of a clear header that identifies the file, any user data that is not private, and multi-keys if they are used. An encrypted part or parts follow this clear data that contain all of the annotations and the objects upon which they depend. Normally this file format is the same as that used for merged, embedded annotation files that reside in the PDF, but this only yields improved software efficiency and is not a necessary condition. It is not necessary this file identify the current user, the owner of the annotations, in any way other than through the encryption that is, the user can decrypt the file. In Server Mode this formatted data sequence is transferred to the server process as the user wishes their new annotations to be known to other users. During the process of the transfer the server is made aware of the user's identification so that it can use its secure information to arrive at the key(s) for the encrypted sections. Note it is not necessary, if a secure server/client connection exists, that this transfer contain encrypted sections. However, since there can be an option where a previously created Local Mode file is from a prior extraction, staying with a common format leads to software efficiency.

The current PDF document is considered "saved" at the end of preceding step and the PDF being viewed is marked as "unchanged" (i.e., not requiring any save). Under no conditions is the current PDF written in modified form to the local disk or to the server. That is, all changes by the current user are contained within the annotation file created in the previous steps and the modified PDF that is active in the viewer/editor is just discarded leaving no residual information about the annotations for others to find later.

The secure content object created includes an encrypted file that contains all of the annotations created or modified by the current user and the original PDF document is not modified. The encryption of these annotations uses a key that is dependent on information that is known only to that user and, in the Server Mode case, to the secure systems of the organization to which the user belongs. The method of encryption and determination of the master key for this encryption may be any known encryption method. Note the common practice for these steps is for the user's annotations to be added to the PDF and a new version of the PDF document created by the save action of the user.

It is not necessary the user ever use the Server Mode. If the user does not, then the user's annotations are private and protected by the encryption. The only restriction in this case is that there are now two files on the local disk: the unmodified PDF (which may also be made secure by encryption) and the user's annotation document. In normal practice these documents are connected by being in a common directory, having the same name but a different name extension (e.g., myfile.pdf and myfile.ant). An example of where such private annotations may be useful is a sales person who annotates a price list with information they feel is important. Since the two modes have much in common, it is up to the user to determine when and if to distribute the user's annotations.

When a user saves his/her annotations in Server Mode it is to allow them to be distributed to others who can view the document. However, there may be some users who can view the document that the user does wish to grant the right to view his/her annotations. A simple example of this is a manager who would like his manager to see his annotations, but his subordinates should not even be aware the annotations exist. This should be true even though they may all have the same PDF document (exact copies, as a single copy was obtained from the server and distributed by the manager).

At some point the server will have an annotation matrix for the document and its annotations. That matrix matches "annotation readers" to "annotation creators". It can be assumed there is at least one reader of an annotation—the creator of the annotations, so the matrix is never empty. A user may use any convenient method to designate who can read his/her annotations of a document. It is also assumed the server can obtain and retain the annotation reader matrix. Also, the method by which the server stores and locates all annotations given it by users is not critical so long as the annotations are available and their owner (creator) and readers identified.

To distribute to users who are allowed to view the PDF document, a new version of the PDF document containing all current annotations is created by the server by doing a "merge" of the new annotations into the original PDF document (the merge process typically only occurs when the document is opened or viewed). This step may occur at the time a user requests a copy of the document or before, as desired by the implementation process.

The merge process will modify the original PDF by adding all of the annotations in a secure manner. Each annotation is encrypted using the multi-key method defined previously. In addition to the Encryption Marker that is added to the front of the annotation data there is included an owner marker (generally this is not clear text but a hash or it may be the something from the Multi-Key method) that will identify the owner/creator of the annotation to the software that decrypts the section. To the front of each encrypted annotation is then added clear text which gives the length of the file and any other information besides that required by the multi-key method, to allow the testing of keys, locating the encrypted parts and/or determining the size of the resultant sequence containing the annotation. The keys that are included in the multi-key encryption are only for those users who have been given the right to view that annotation. Thus those who obtain this annotation but do not have viewing rights would need to break the encryption to gain access to the content of the annotation file.

All of the annotation data sequences (files) created above are concatenated together to form one sequence. Depending on the implementation, clear text may be added as required during this step to give a structure to the sequence that would allow separation into annotation file parts at a later time.

The data sequence created above is then added to the original PDF document or, if the PDF document is contained within another PDF document as secure content, to the top level PDF as a Stream Object. This stream has the Type "EmbeddedFile" so that it conforms with the PDFRM. For ease of future reference, when the PDF is opened the object may be added to the NameTree (PDFRM Section 7.2) and linked to an action supported by a Plug-In. Different methods are defined within the DPFRM for referencing this Stream Object and the choice of which is used is implementation dependent.

The new PDF document with original document and annotation document is given to any user(s) who the server determines has the right to possess a copy of the document. Note that when the Stream Object is added to the PDF document by the server at the time of the request for a copy by a user, annotations that cannot be viewed by that user need not be included in the PDF document. As to whether or not they are included is implementation dependent.

In this process, the encryption of each annotation is unrelated to any of the others except through the use of Multi-Key encryption methods for a given user set. User identification handling and the generation of the necessary items for using Multi-Key encryption occurs on the server that is assumed to be secure. The Stream Object that is created may be marked as an "EmbeddedFile" per the PDFRM but there need not be a "File Specification" for the object (PDFRM Section 7.4) as it is not normally used as a "file" in the PDFRM sense. The link to the Stream Object will exist somewhere in the top level PDF to allow opening and to keep it from being an orphan (orphaned objects are sometimes removed from PDF files by applications).

When a user opens for viewing a secure content object containing at least one annotation, a sequence of events must occur to present the annotations as part of the PDF. Note the user may also have a Local Mode annotation for this document that must be considered in this process. What or how the sequence is triggered is both viewer and implementation dependent, as is whether or not the events occur before the user sees any part of the document or after it is partially or fully open. The end result should be the same in all cases if the viewer either automatically shows the modified document or is triggered to "refresh" at the end of processing of the annotations.

Although not necessary, the following assumes all of the annotation actions occur before the user sees the document. It also assumes a method is provided for obtaining, or having obtained, the user identification information necessary for the generation of encryption keys. How this is done is implementation specific.

It is also assumed the viewer application can change the basic structure of the PDF document it has started processing in memory and has encountered an event that starts the annotation processing. This is normally true as even the simple act of opening the Pop-Up associated with an annotation results in an edit to a value in a dictionary—a change of the type that is assumed. The exact implementations of the methods of this section may vary.

At the time the viewer has the underlying structure of the PDF document available the following steps may occur to put the annotations into the viewable PDF. A check is made on the local disk for a Local Mode annotation. If it is found, it is processed first in the manner given below for other annotations. The only difference is that any annotations which it contains are placed in the PDF with the "read only" flag bit not set (PDFRM Table is 6.10 under the "F" dictionary key).

The Object Stream created by the server in the PDF is located and any clear header information required to set up the processing of the annotations is read and processed. Any user identification needed for the decryption must be obtained before this step completes. The processing then moves to the first annotation contained in the Steam Object.

The decryption of the front section of the encrypted annotations is attempted using the current user identification. In most cases this implies that the Encryption Marker section at the front of the annotations is decrypted for each possible key of the Multi-Key method. That is, there is no way to know which of the Multi-Key keys will decrypt the data for this user, so each must be tried in turn. If none of the Multi-Key decryption attempts yields the expected values for the encrypted header then it is assumed the current user is not allowed to read the annotations contained within this document and this annotation set is skipped with processing of this step beginning again with the next annotation in the Stream Object. If the encrypted header has been correctly decrypted, processing moves to the next step.

With the decryption of the encrypted header, decryption of the owner information within the annotation document can be achieved. If the current user is the owner of this annotation and there was a Local Mode annotation processed, this annotation is skipped as it is assumed to be replaced by the Local Mode annotation. The decrypted owner information also is used to set or clear the "read only" flag required for the next step as only owner readers are allowed to edit an annotation.

Next, each of the annotations in the document is decoded, along with any dependent objects, and added to the viewer's PDF structure. For each top level and each secondary level Pop-Up annotation the indirect object number is noted as is the page upon which the annotation is to reside. After placement of the annotation or any Pop-Up annotation in the PDF structure, a special key/value pair is added to their dictionary that indicates the annotation is not owned by the current user. This key/value is used during the extraction process, as described previously, to know which annotations in the PDF should be saved.

After all of the annotation objects and their dependent objects have been added to the viewer's form of the PDF document, the annotations and their Pop-Up objects are added to any existing Page Objects Array Object under the "Annots" key as indirect objects. If the "Annots" key does not exist, it is created. The Page Objects are located using the saved page numbers of the previous step. This conforms to Section 6.4 of the PDFRM.

After all annotations in this stream file are added, processing moves to the next item in the Stream Object and the processing repeats the decryption step. If there are no more annotations in the stream, processing ceases and the viewer, in the case where this is at the Pre-views Load, is instructed to show the document to the user.

The annotations are as secure as the encryption method can provide since the user identification information is not known even when located on an insecure computer. There is nothing in the annotations embedded in the Object Stream that indicates either the owner or content of any user's annotations. The visible structure can be used only to find the number of annotations that are to be processed—a rather limited amount of information. The decision on whether or not the current user can view an annotation set contained within one of the files of the stream is dependent only upon the encryption method and the strength of the encryption key. That is, there are no "hidden" flags or other indicators as to who is a reader of an annotation set contained within the Stream Object or the Local Mode annotation file. The owner information is in the encrypted section and cannot be modified by one who cannot decrypt and reconstruct the file.

The invention has been described with reference to a particular embodiment. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

What is claimed is:

1. A secure content object for distributing and controlling access to a document and annotations associated with the document, comprising:

an electronic document, the electronic document having been encrypted with a document encryption key, wherein access to the electronic document is available to a first set of authorized users;

an encrypted header comprising information pertaining to the electronic document;

a first multi-key encryption table for use in a multi-key encryption method associated with the electronic document, the first table comprising at least one multi-key component associated with each authorized user in the first set and a plurality of dummy encryption components, wherein the multi-key encryption table includes no information that may identify a user or the electronic document;

a plurality of annotations associated with the electronic document, generated by an annotation author and having been encrypted with an annotation encryption key, wherein access to the plurality of annotations is available to authorized annotation users comprising the annotation author and those users in the first set having been designated by the annotation author as having access to the plurality of annotations;

a second multi-key encryption table for use in a multi-key encryption method associated with the plurality of annotations, the second table comprising at least one multi-key component associated with each authorized annotation user; and a user interface device comprising unencrypted information for identifying the electronic document and an interactive element for enabling a user to input a user authorization for access to at least a portion of the encrypted electronic document, for inputting the user authorization to a decryption engine using the multi-key encryption method for combining the user authorization with each of the multi-key components in the first multi-key encryption key table to decrypt the encrypted header, and for combining the user authorization with each of the stored multi-key components in the second multi-key encryption key table to decrypt an annotation, wherein upon a valid decryption of the annotation indicates the correct annotation encryption key has been found and the user is an authorized annotation user; and upon a valid decryption of the encrypted header, for enabling decryption of the portion of the encrypted electronic document.

2. The secure content object of claim 1, wherein the encrypted header includes an encryption marker comprising a random number sequence followed by a derivable variation of the same random number sequence, wherein a valid decryption of the encryption marker indicates the document encryption key has been found.

3. The secure content object of claim 1, wherein the electronic document comprises content information that is formatted based on an object language having a set of formatting rules.

4. The secure content object of claim 3, wherein the content information is selected from the group consisting of text, graphics, equations, tables, spreadsheets, pictures, video files, audio files, multimedia files and binary data of unknown format.

5. The secure content object of claim 3, wherein the object language comprises Adobe Acrobat.

6. The secure content object of claim 3, wherein the object language comprises a language which interprets Microsoft Word documents.

7. The secure content object of claim 1, wherein the user interface device comprises a second electronic document.

8. The secure content object of claim 1, wherein the information pertaining to the electronic document comprises a user permission table for access to all or portions of the electronic document and wherein only those permitted portions of the electronic document are decrypted.

9. The secure content object of claim 1, wherein the encrypted header and the encrypted electronic document are encrypted using different encryption keys and wherein the multi-key encryption table includes at least one multi-key component for each encryption key.

10. The secure content object of claim 9, wherein the encrypted header includes an encryption marker comprising a random number sequence followed by a derivable variation of the same random number sequence, wherein a valid decryption of the encryption marker indicates the header encryption key has been found; and wherein the encrypted electronic document includes an encryption marker comprising a random number sequence followed by a derivable variation of the same random number sequence, wherein a valid decryption of the encryption marker indicates the document encryption key has been found.

11. The secure content object of claim 1, wherein the encrypted header further comprises a fingerprint for identifying a predefined aspect of the electronic document.

12. The secure content object of claim 1, wherein the electronic document comprises a plurality of individual electronic documents, the encrypted header comprises information pertaining to each of the individual electronic documents.

13. The secure content object of claim 12, wherein the information pertaining to the electronic document comprises a user permission table setting forth access to all or portions of each of the individual electronic documents and wherein only those permitted portions of the authorized electronic document are decrypted.

14. The secure content object of claim 1, wherein the electronic document includes a document ID and wherein the document encryption key includes a combination of the document ID, the user information and the multi-key component, for each authorized user.

15. The secure content object of claim 1, wherein the electronic document comprises a first electronic document and an annotation associated therewith, wherein the annotation is encrypted using an encryption key associated with a user generating the annotation; and wherein the encrypted header includes information pertaining to the first electronic document and the annotation.

16. A method for creating a secure content object for distributing and controlling access to a document and annotations associated with the document, comprising:
   providing an electronic document, wherein access to the electronic document is available to a first set of users;
   responsive to a first user from the first set of users, generating a plurality of annotations pertaining to the electronic document using the document language and associating the plurality of annotations with the first user;
   designating which users in the first set of users are authorized users have access to the plurality of annotations;
   encrypting each annotation using an annotation encryption key associated with the first user generating the particular annotation, wherein access to an encrypted annotation is available to authorized users having access to the respective annotation encryption key;
   for each annotation encryption key:
      generating a multi-key encryption table for use in a multi-key encryption method, the table comprising at least one multi-key component associated with each authorized user having been designated by the first user as having access to the annotation;
      providing a user interface for enabling a user to input a user authorization for access to at least a portion of an encrypted annotation;
      wherein, responsive to an input user authorization, combining the input user authorization with each of the stored multi-key components in the multi-key encryption key table to decrypt the annotation, wherein valid decryption of the annotation indicates the correct annotation encryption key has been found;
   concatenating the plurality of encrypted annotations in a second electronic document; and
   merging the second electronic document and the encrypted electronic document into a third electronic document such that access to the encrypted electronic document is available to the first set of users and access to the encrypted annotations in the separate file is provided only to authorized users.

17. The method of claim 16, further comprising the step of encrypting the first electronic document using a document encryption key, wherein access to the encrypted electronic document is provided only to the first set of users;
   generating a multi-key encryption table for use in a multi-key encryption method, the table comprising at least one multi-key component associated with each of the first set of users;
   generating an encrypted header comprising information pertaining to the electronic document;
   providing a user interface for enabling a user to input a user authorization for access to at least a portion of the encrypted document;
   combining the user authorization with each of the stored multi-key components in the multi-key encryption key table to decrypt the encrypted header; wherein valid decryption of the encrypted header indicates the document encryption key has been found.

18. The method of claim 16, further comprising adding an unencrypted header identifying the generating user to each encrypted annotation.

19. The method of claim 16, wherein the encrypted header includes an encryption marker comprising a random number sequence followed by a derivable variation of the same random number sequence, wherein a valid decryption of the encryption marker indicates the annotation encryption key has been found.

20. The method of claim 16, wherein the separate file and the electronic document are stored in different locations.

* * * * *